(12) United States Patent
Hayakawa et al.

(10) Patent No.: US 6,811,271 B2
(45) Date of Patent: Nov. 2, 2004

(54) ELECTROMAGNETIC WAVE FOCUSING DEVICE

(75) Inventors: Yukio Hayakawa, Chofu (JP); Morio Shimizu, Chofu (JP)

(73) Assignee: National Aerospace Laboratory of Japan, Tokyo (JP)

( * ) Notice: Subject to any disclaimer, the term of this patent is extended or adjusted under 35 U.S.C. 154(b) by 150 days.

(21) Appl. No.: 10/135,371

(22) Filed: May 1, 2002

(65) Prior Publication Data

US 2002/0171951 A1 Nov. 21, 2002

(30) Foreign Application Priority Data

May 17, 2001 (JP) ........................................ 2001-147202

(51) Int. Cl.⁷ .............................................. G02B 7/182
(52) U.S. Cl. ........................ 359/846; 359/852; 359/853; 359/858
(58) Field of Search .......................... 343/721; 359/846, 359/847, 365, 727, 728, 729, 852, 853, 858

(56) References Cited

U.S. PATENT DOCUMENTS

| | | | | |
|---|---|---|---|---|
| 1,698,905 A | * | 1/1929 | Beechlyn | 362/302 |
| 1,951,404 A | * | 3/1934 | Goddard | 126/581 |
| 2,825,063 A | * | 2/1958 | Spencer | 343/837 |
| 3,118,437 A | * | 1/1964 | Huint | 126/600 |
| 3,938,162 A | * | 2/1976 | Schmidt | 343/840 |
| 4,116,541 A | * | 9/1978 | Weiss | 359/853 |
| 4,119,365 A | * | 10/1978 | Powell | 359/848 |
| 4,439,020 A | * | 3/1984 | Maruko | 359/729 |
| 6,502,944 B1 | * | 1/2003 | Dragovan | 359/847 |

FOREIGN PATENT DOCUMENTS

GB  2176022 A  * 12/1986

* cited by examiner

Primary Examiner—John Juba, Jr.
(74) Attorney, Agent, or Firm—Westerman, Hattori, Daniels & Adrian, LLP

(57) ABSTRACT

The electromagnetic wave focusing device has a mirror group consisting of a focal-line type primary reflective mirror and secondary reflective mirror which have a unique parabolic cross-sectional shape. Incident light rays are primarily reflected by the primary reflective mirror and are then secondarily reflected by the secondary reflective mirror, so that solar rays are focused at one point. The electromagnetic wave focusing device can be made extremely thin and light-weight, and can be folded without causing great loss of precision or great increase in mass. Consequently, the mirror bodies can be folded into a compact form and loaded inside the restricted space of a rocket or the like; thus, the device can be transported into aerospace, and a sunlight focusing device having high focusing performance can be reproduced on-site with a high precision.

6 Claims, 11 Drawing Sheets

FIG. 1-A
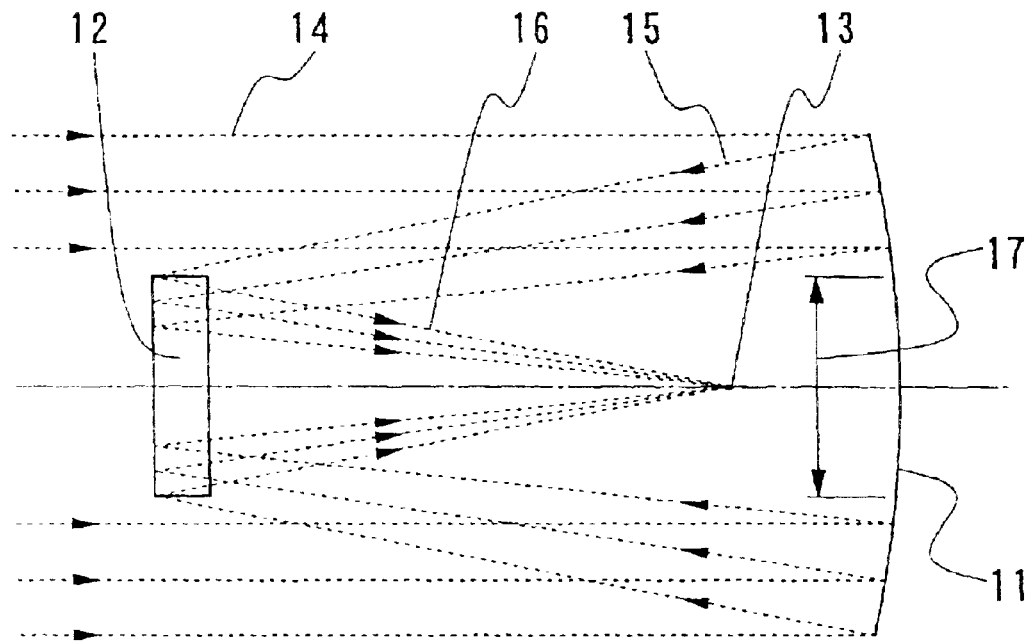
FIG. 1-B
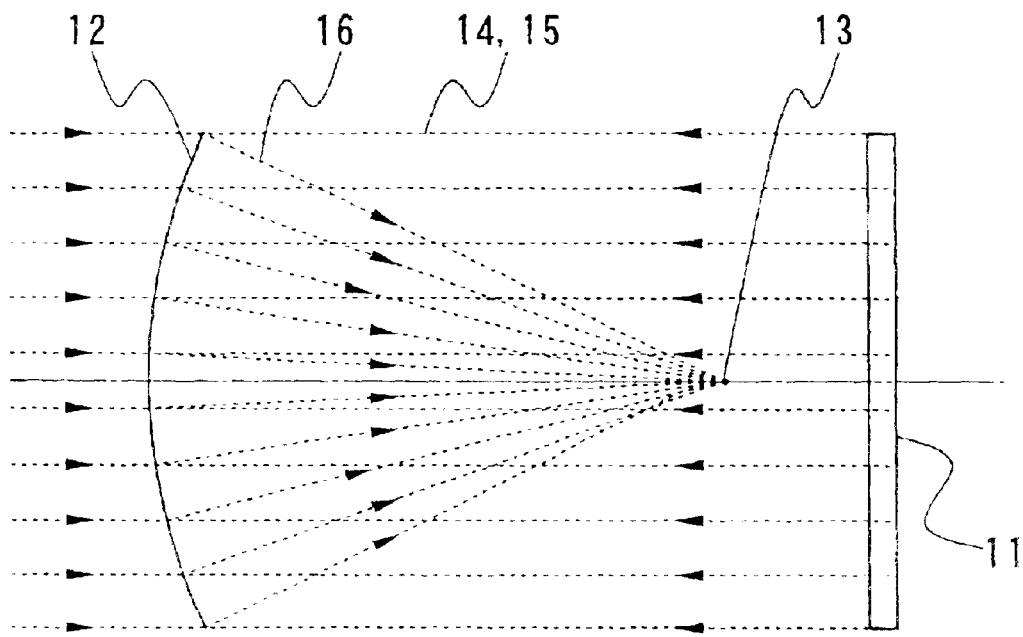

FIG. 2-A
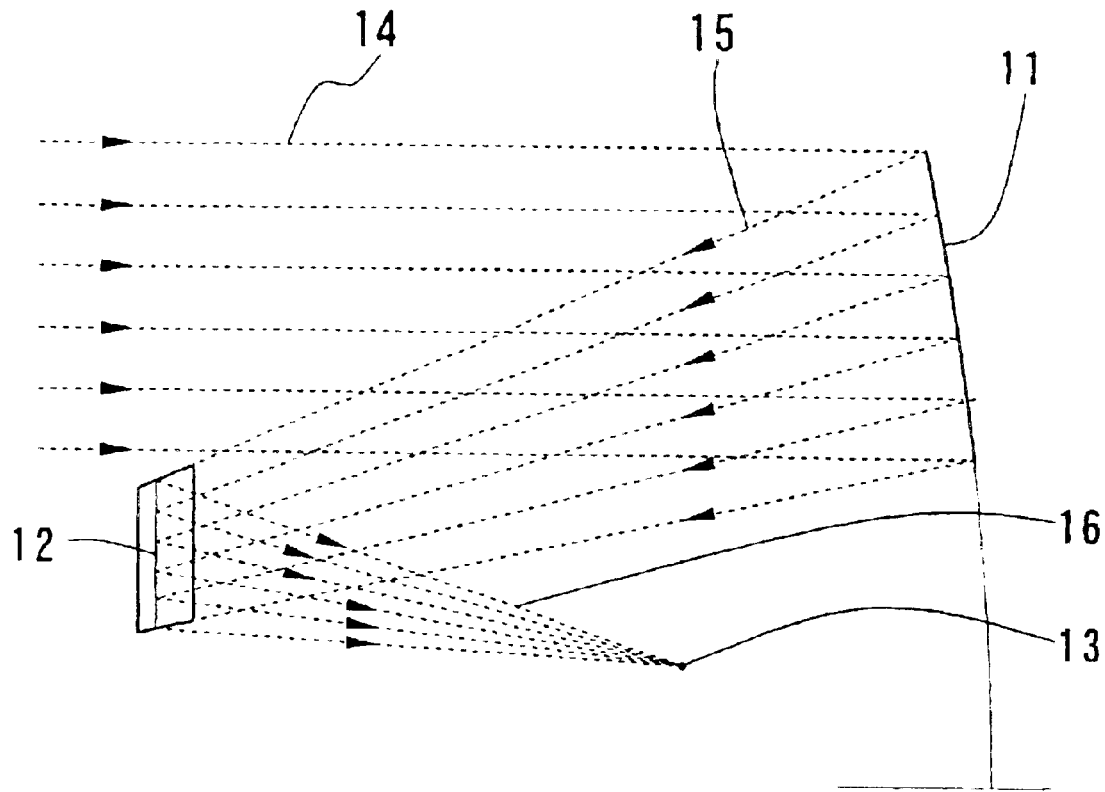
FIG. 2-B
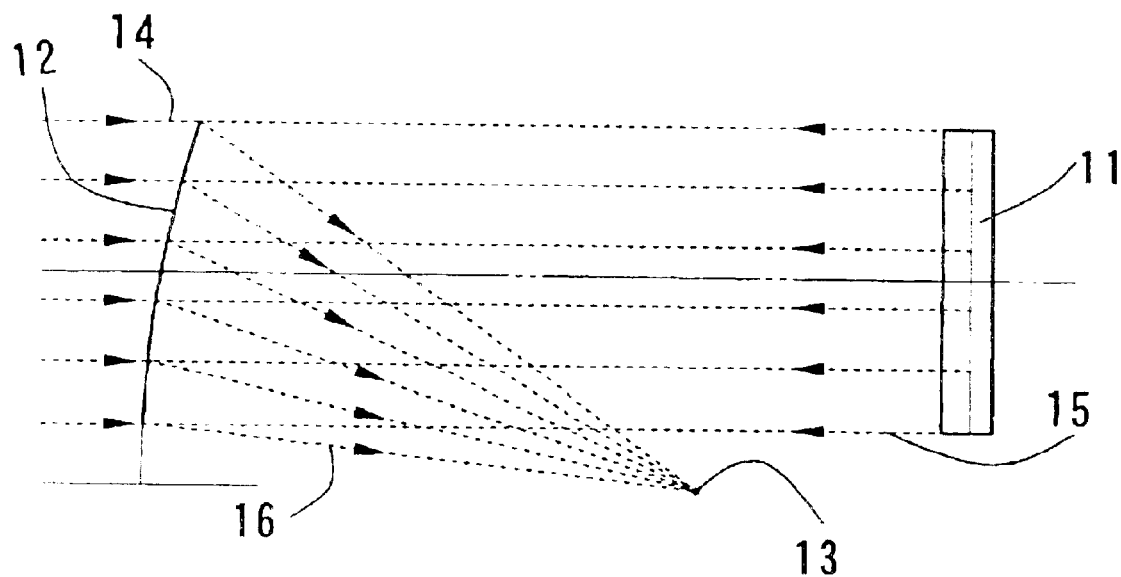

FIG. 3-A
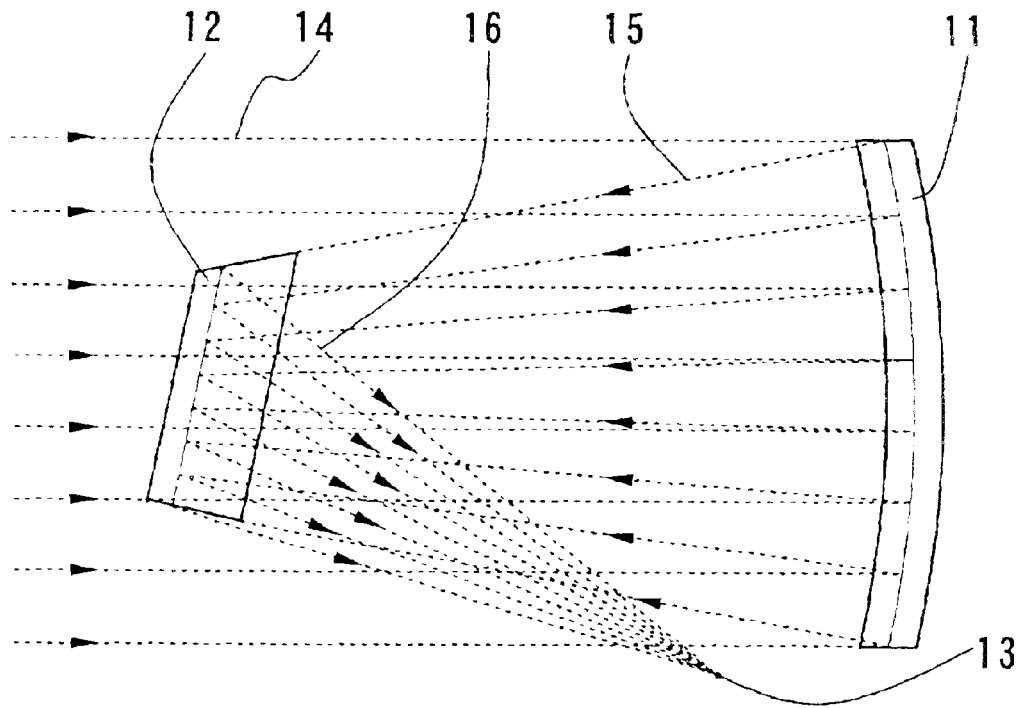
FIG. 3-B
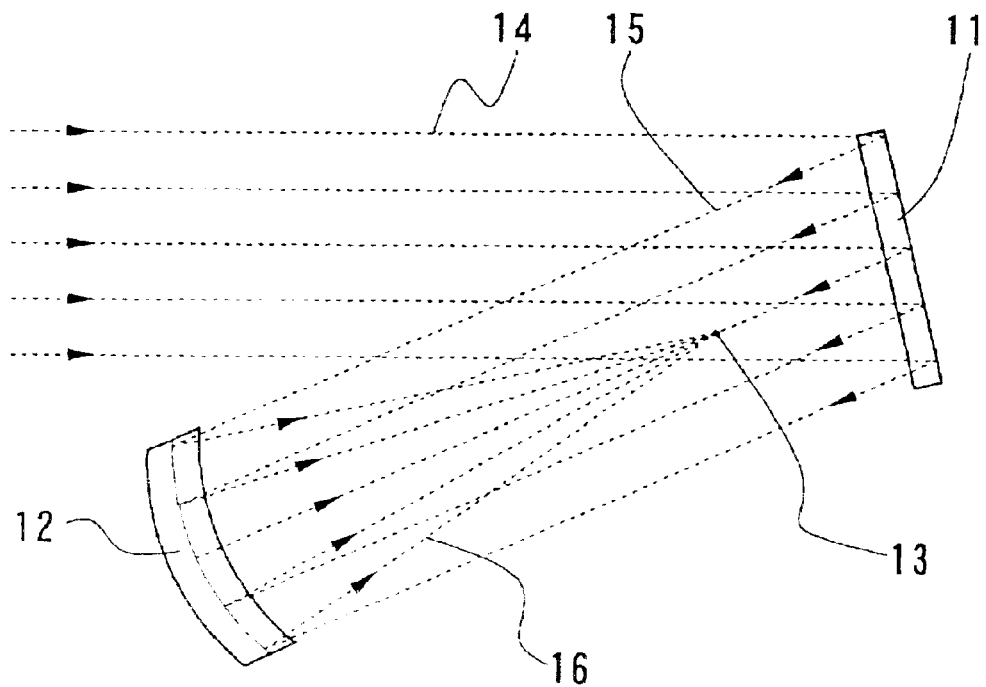

FIG. 4-A
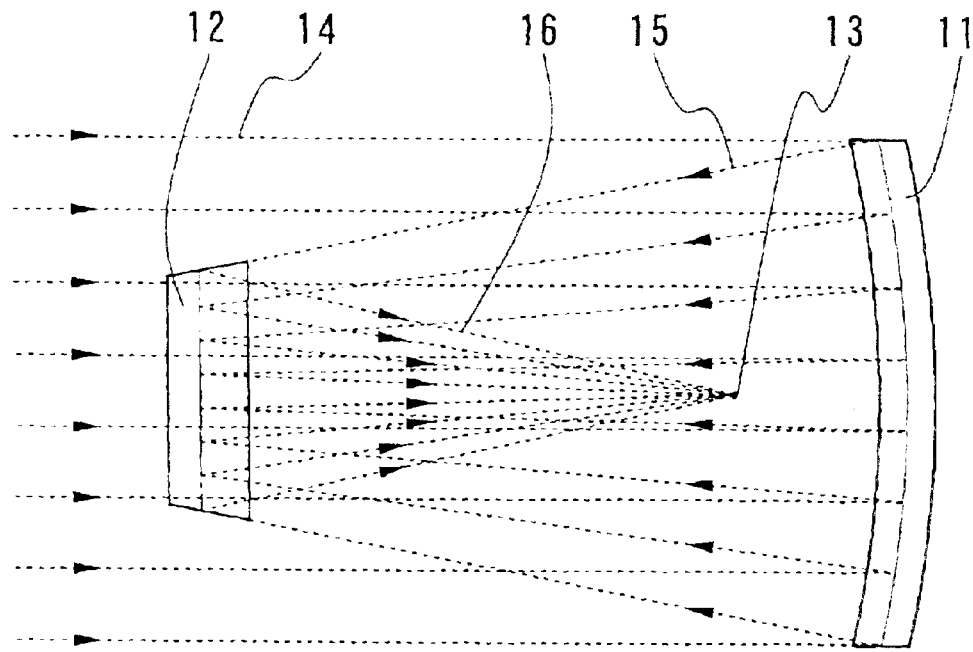
FIG. 4-B
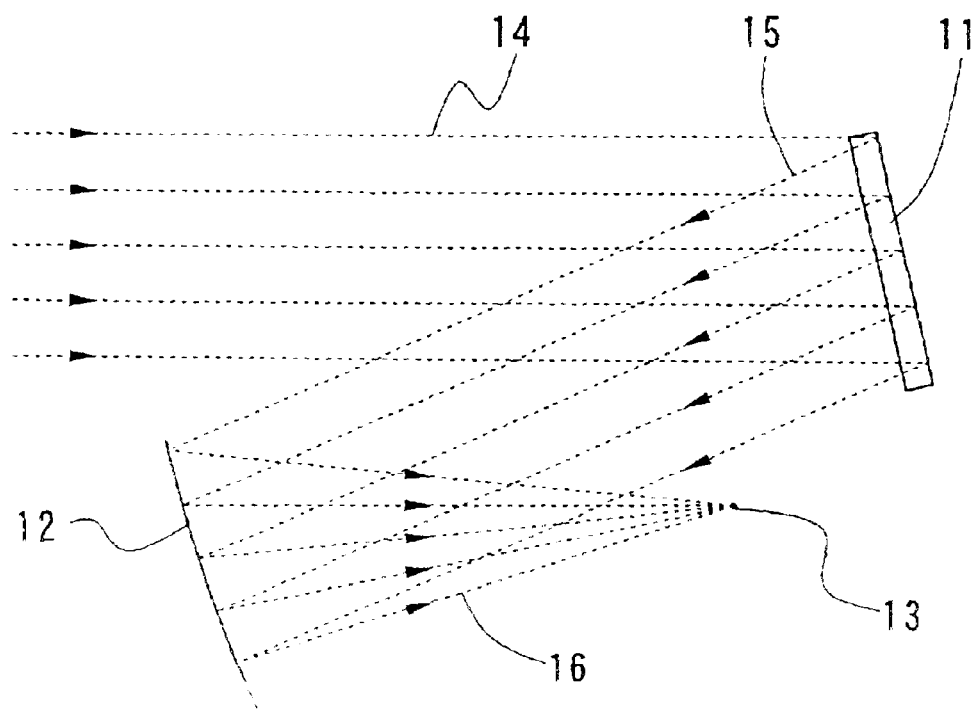

FIG. 5-A
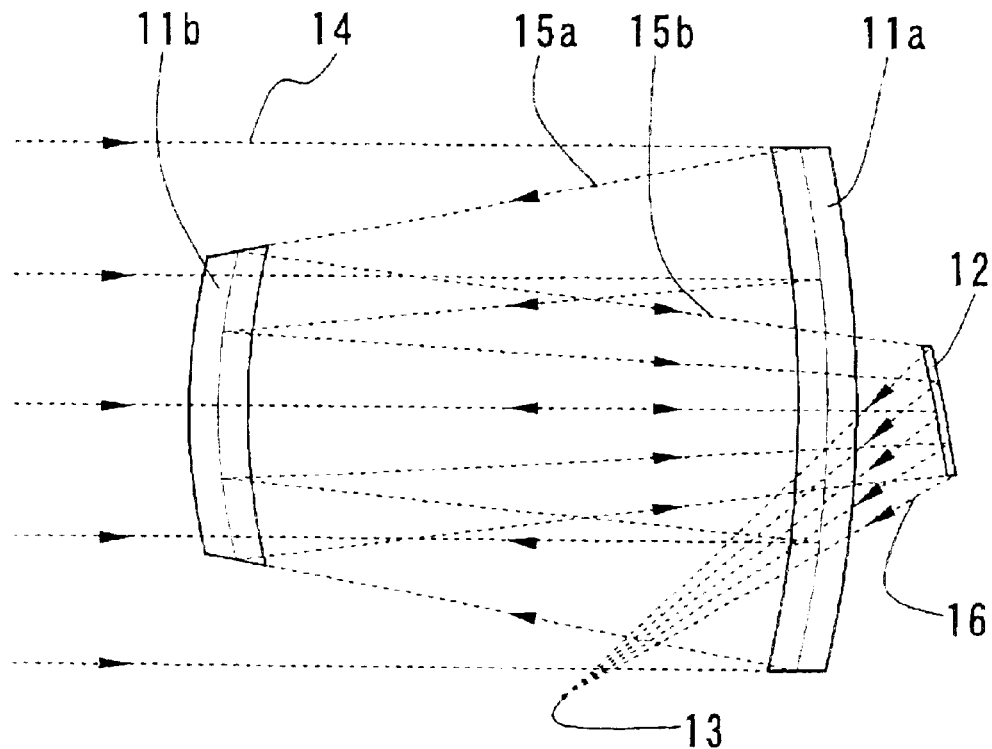
FIG. 5-B
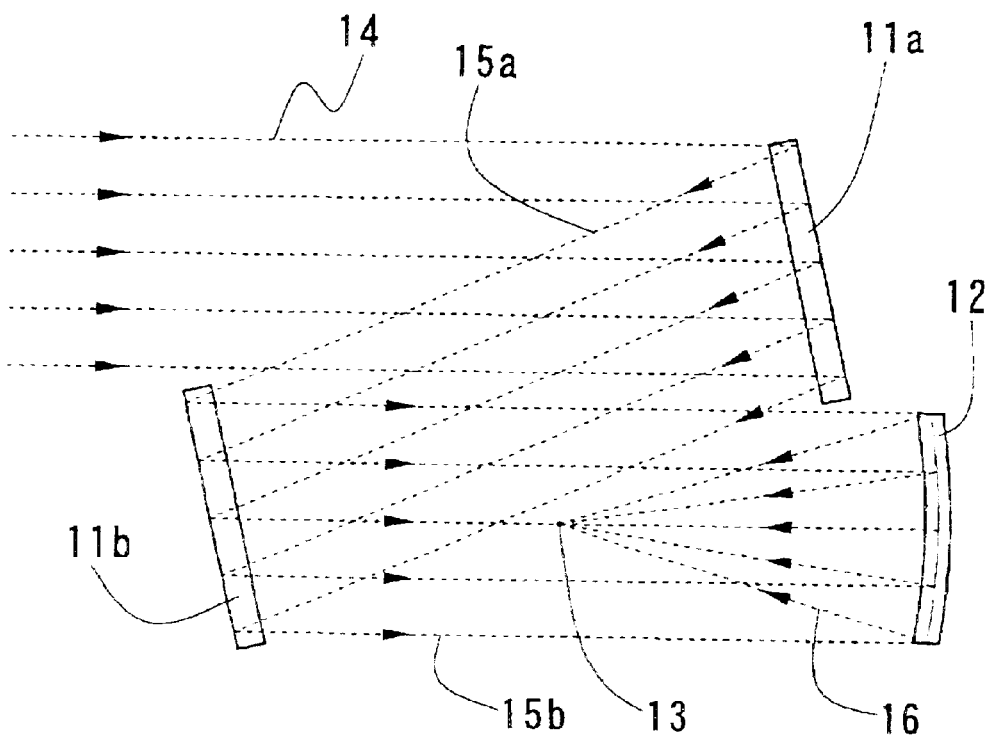

ELECTROMAGNETIC WAVE FOCUSING DEVICE

BACKGROUND OF THE INVENTION

1. Field of the Invention

The present invention relates to an electromagnetic wave focusing device, and more particularly to an electromagnetic wave focusing device which can be used as a sunlight focusing device in a spacecraft propulsion system that is utilized in order to heat propellant molecules directly in the form of thermal energy without any conversion of solar energy into electric power or the like, or which can be used as a transmitting and receiving device of electromagnetic wave used in communications.

2. Description of the Related Art

A spacecraft propulsion system utilizing solar heat has not yet been realized. However, solar thermal propulsion systems can utilize hydrogen, which is the lightest molecule, as a propellant; accordingly, such propulsion systems make it possible to realize a high specific impulse that is approximately 2 to 4 times that of conventional chemical propulsion (800 to 900 seconds). In terms of specific impulse, this does not reach the level of ion propulsion. In the case of ion propulsion, however, there is a loss due to the fact that the energy of sunlight undergoes two conversions, i.e., a "light-electric power" conversion performed by a solar battery, and an "electric power-electric power" conversion performed by a power processor. Accordingly, solar thermal propulsion is superior in terms of energy per unit light-receiving area, so that if the light focusing apparatus can be made sufficiently light-weight, solar thermal propulsion which utilizes solar energy directly is more advantageous.

It is conceivable that a rotational-parabolic mirror or a portion of such a mirror might be utilized as a sunlight focusing device for focusing sunlight in one place in a spacecraft propulsion system utilizing solar heat. In addition to light-weight, high precision may be cited as one of the conditions required in a mirror that is utilized in a sunlight focusing device. However, these two requirements are in a conflicting relationship. Specifically, the mirror surface body must be made thin in order to reduce the weight, but if this mirror surface is made thin, a high degree of precision cannot be maintained in the case of a self-standing mirror, and in the case of a system in which the mirror surface is installed along a frame assembly, the mass of the frame assembly is added, so that it becomes difficult to reduce the weight. If such points are taken into consideration, the limits have more or less been reached in any approach that utilizes a conventional focal-point rotational-parabolic surface.

As described above, in the case of mirrors that utilize a conventional rotational-parabolic surface, satisfactory performance as a spacecraft propulsion system could not be obtained with the combination of mass and precision that could be achieved. Furthermore, in cases where a spacecraft propulsion system is carried into space, the system must be folded up to be loaded inside the fairing of the launch rocket; as a result, partitioning the mirror leads to a much greater increase in mass and drop in precision.

SUMMARY OF THE INVENTION

With the foregoing in view, it is an object of the present invention to provide an electromagnetic wave focusing device, or more concretely a sunlight focusing device, which makes it possible to realize a lighter weight with the same light focusing performance, or to realize a higher light focusing performance at the same mass per unit light-receiving area, compared to a sunlight focusing device with a mirror that utilizes a conventional rotational-parabolic surface.

The present inventor conducted various studies based on the following idea: namely, it is theoretically possible to cause the complete convergence of plane waves at one point by combining two perpendicular focal lines, or more specifically, by combining parabolic cylinder mirrors so that the mirror image of the focal line of a primary reflective mirror in a secondary reflective mirror and the focal line of the secondary reflective mirror are perpendicular, as a method that can be used in place of a method that utilizes a rotational-parabolic surface in a sunlight focusing device. The formation of a parabolic surface that has a focal line is far easier than the formation of a rotational-parabolic surface. Ordinarily, a surface that is close to a parabolic surface with a focal line can easily be formed; however, the formation of a rotational-parabolic surface is extremely difficult. For example, in the case of a film which possesses elasticity such as a rubber film, a rotational-parabolic surface can be approximated to some extent; however, a large force is necessary in order to maintain the parabolic surface. The fact that a surface that is close to a parabolic surface with a focal line can be easily formed is useful in constructing a light-weight, high-precision mirror, and in the case of a parabolic surface with a focal line, the mirror itself can be made extremely thin if a frame assembly is installed at two ends and the aperture; furthermore, the frame assembly itself can also be simplified by further expedients.

The electromagnetic wave focusing device of the present invention is based on the above findings; this electromagnetic wave focusing device comprises a mirror group consisting of a focal-line type primary reflective mirror and secondary reflective mirror that have a unique parabolic cross-sectional shape in an arbitrary cross section that is perpendicular to a certain direction; furthermore, this electromagnetic wave focusing device is devised so that incident plane waves are primarily reflected by said primary reflective mirror, and are then secondarily reflected by said secondary reflective mirror, thus causing these plane waves to be focused at a single point. As described above, the electromagnetic wave focusing device of the present invention is not limited to a sunlight focusing device, but can also be utilized as a transmitting and receiving device of electromagnetic wave used in communications.

BRIEF DESCRIPTION OF THE DRAWINGS

FIG. 1 shows the focusing principle of parallel light rays using these two focal-line type parabolic cylinder mirrors in the electromagnetic wave focusing device of the present invention, with FIG. 1-A showing a plan view, and FIG. 1-B showing a side view;

FIG. 2 shows schematic diagrams that illustrate the construction of an embodiment of the electromagnetic wave focusing device of the present invention in which the primary reflective mirror and secondary reflective mirror are asymmetrical parabolic cylinder mirrors, with FIG. 2-A showing a plan view, and FIG. 2-B showing a side view;

FIG. 3 shows schematic diagrams that illustrate the construction of another embodiment of the electromagnetic wave focusing device of the present invention in which the primary reflective mirror and secondary reflective mirror are inclined symmetrical parabolic cylinder mirrors, with FIG. 3-A showing a plan view, and FIG. 3-B showing a side view;

FIG. 4 shows schematic diagrams that illustrate the construction of still another embodiment of the electromagnetic wave focusing device of the present invention in which the primary reflective mirror is an inclined symmetrical parabolic cylinder mirror and the secondary reflective mirror is an asymmetrical parabolic cylinder mirror, with FIG. 4-A showing a plan view, and FIG. 4-B showing a side view;

FIG. 5 shows schematic diagrams that illustrate the construction of still another embodiment of the electromagnetic wave focusing device of the present invention in which the primary reflective mirror is replaced by two non-parabolic cylinder mirrors, with FIG. 5-A showing a plan view, and FIG. 5-B showing a side view;

DESCRIPTION OF THE PREFERRED EMBODIMENTS

Figure 6:
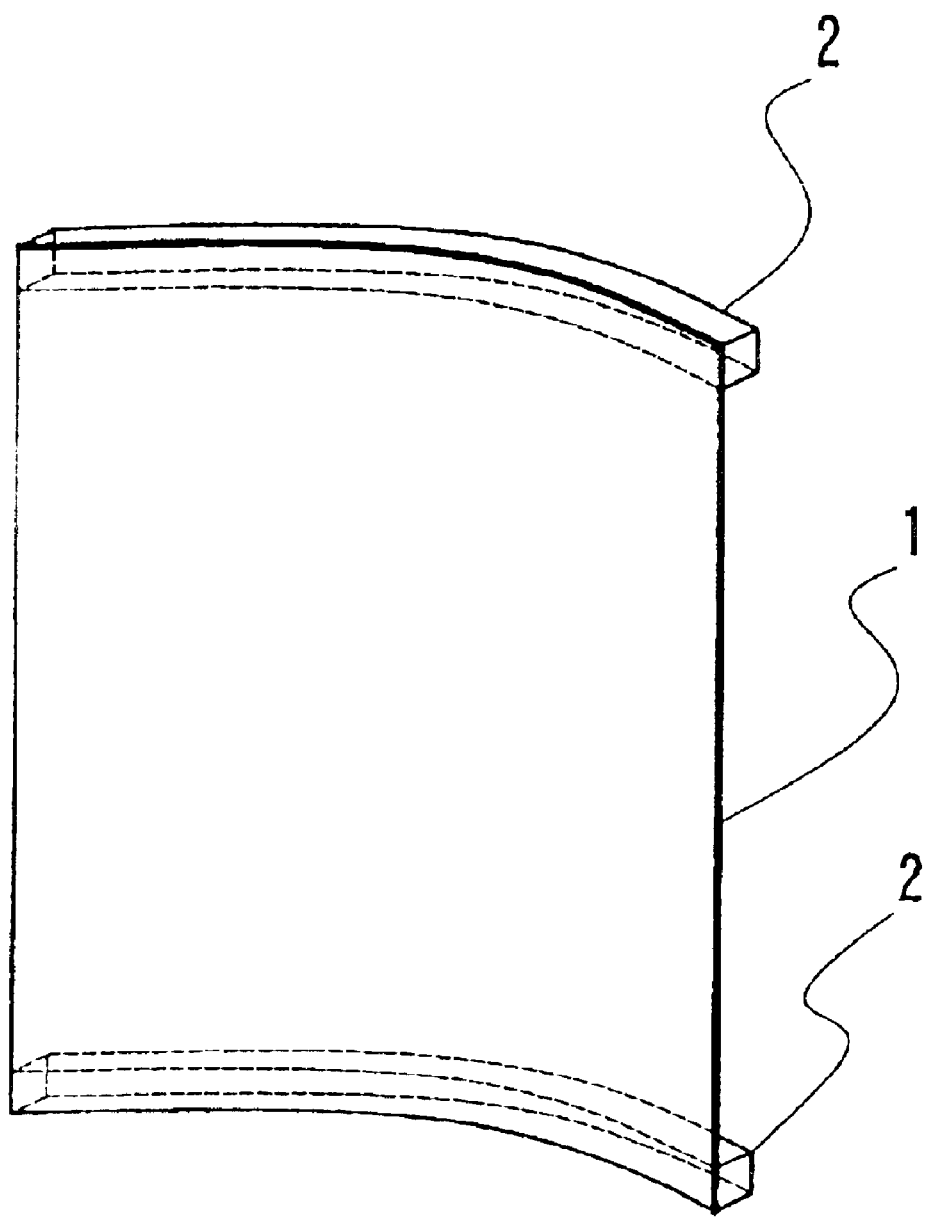
FIG. 6 is a perspective view which shows an embodiment in which the reflective mirrors in FIGS. 1 through 4 are constructed from thin-plate-form mirrors in which only the two ends of the mirror are supported by curved supporting members.

Embodiments of a sunlight focusing device based on the electromagnetic wave focusing device of the present invention will be described below with reference to the attached figures.

First, the focusing theory of the present invention will be described with reference to FIG. 1. FIG. 1 shows diagrams that illustrate a combination of focal-line type parabolic cylindrical reflective mirrors in one embodiment of the sunlight focusing device of the present invention; FIG. 1-A is a plan view, and FIG. 1-B is a side view.

In FIG. 1-A, incident light rays 14 that are parallel incident waves travel from the left to the right in the figure and are incident on the primary reflective mirror 11 which has an axis of symmetry that is parallel to the incident light rays 14. Viewed from above, the cross-sectional shape of the primary reflective mirror 11 is a parabola. Accordingly, the primary reflected light rays 15 that are the primary reflected waves reflected by the primary reflective mirror 11 advance toward the focal-line of the primary reflective mirror 11; however, before reaching this focal line, the primary reflected light rays 15 are reflected by a secondary reflective mirror 12 which has an axis of symmetry that is parallel to the incident light rays 14. When viewed from above, the secondary reflective mirror 12 acts in the same manner as a planar mirror with respect to the primary reflected light rays 15; accordingly, the secondary reflected light rays 16 converge at the focal point 13, which is the point of symmetry of the focal line of the primary reflective mirror 11 in a cases where the reflective surface of the secondary reflective mirror 12 is the plane of symmetry.

In FIG. 1-B, the primary reflective mirror 11 acts in the same manner as a planar mirror with respect to the incident light rays 14 when viewed from side. Accordingly, the primary reflected light rays 15 from the primary reflective mirror 11 are parallel to the incident light rays 14 and oriented in the opposite direction. Afterward, the primary reflected light rays 15 are reflected by the secondary reflective mirror 12, and the secondary reflected light rays 16 converge at the focal line of the secondary reflective mirror 12. In this case, it is necessary to select the focal lengths and spacing of the primary reflective mirror 11 and secondary reflective mirror 12 so that the position of the focal line of the secondary reflective mirror 12 coincides with the position of the focal point 13. As a result, the incident light rays 14 converge at the focal point 13, which is a single point in space.

In the embodiment shown in FIG. 1, the range 17 indicated by arrows at both ends on the mirror surface of the primary reflective mirror 11 is in the shadow of the secondary reflective mirror 12; however, if a disposition which is such that the primary reflective mirror 11 is not in the shadow of the secondary reflective mirror 12 is used, the mirror surface can be utilized without any waste. FIGS. 2 through 4 below relate to examples of such combinations of focal-line type parabolic cylinder mirrors.

FIG. 2 shows an embodiment in which both the primary reflective mirror and secondary reflective mirror are formed as asymmetrical parabolic cylinder mirrors; FIG. 2-A is a plan view, and FIG. 2-B is a side view.

In this case, both the primary reflective mirror 11 and secondary reflective mirror 12 are formed as asymmetrical parabolic cylinder mirrors; here, the term "asymmetrical parabolic cylinder mirror" refers to a mirror in which the mirror surface portion is asymmetrical with respect to the axis of symmetry of a parabola superimposed on the cross-sectional shape of the mirror.

FIG. 3 shows an embodiment in which both the primary reflective mirror and secondary reflective mirror are formed as inclined parabolic cylinder mirrors; FIG. 3-A is a plan view, and FIG. 3-B is a side view.

In this case, both the primary reflective mirror 11 and the secondary reflective mirror 12 are formed as inclined parabolic cylinder mirrors; here, the term "inclined" refers to the fact that the angle formed by the focal line of the reflective mirror and the incident light rays is not a right angle.

FIG. 4 shows an embodiment in which the primary reflective mirror is formed as an asymmetrical parabolic cylinder mirror, and the secondary reflective mirror is formed as an inclined parabolic cylinder mirror; FIG. 4-A is a plan view, and FIG. 4-B is a side view.

In this embodiment, the primary reflective mirror 11 is formed as an asymmetrical parabolic cylinder mirror, and the secondary reflective mirror 12 is formed as an inclined parabolic cylinder mirror. Furthermore, although this is not shown in the figures, it would also be possible to use an inclined parabolic cylinder mirror for the primary reflective mirror 11, and to use an asymmetrical parabolic cylinder mirror for the secondary reflective mirror.

In the embodiments shown in FIGS. 2 through 4, the usual reason for using an asymmetrical parabolic cylinder mirror or inclined parabolic cylinder mirror as the secondary reflective mirror 12 as well is to avoid the creation of a shadow on the secondary reflective mirror 12 with respect to the primary reflected light rays 15 by the object of heating, which is disposed at the position of the focal point 13.

In the above embodiments, cases are described in which parabolic cylinder mirrors are used for both the primary reflective mirror and secondary reflective mirror. However, these mirrors used are not necessarily limited to parabolic cylinder mirrors; it would also be possible to use a construction in which the primary reflective mirror or secondary reflective mirror is replaced by a single mirror or a plurality of mirrors that have a focusing function equivalent to that of a parabolic cylinder mirror, and that have a unique cross-sectional shape in an arbitrary cross section perpendicular to a certain direction. For example, it would also be possible to use cylindrical mirrors instead of parabolic cylinder mirrors. Cylindrical mirrors do not have a fine focal line with respect to parallel light rays; however, since the light is focused in a specified range, this may be viewed as an indistinct focal line. Furthermore, in cases where the focal length is sufficiently long relative to the width of the mirror, the difference in focusing capacity from a "parabolic cylinder mirror" is slight. Meanwhile, the following advantage is also obtained: namely, "cylindrical mirrors" are far superior to parabolic cylinder mirrors in terms of the relative ease of manufacturing the "curved supporting members" described later.

Furthermore, a construction such as that shown in FIG. 5 may be used in order to construct a system in which a parabolic cylinder mirror is replaced by a plurality of mirrors. In the embodiment shown in FIG. 5, the function of the primary reflective mirror 11 is divided between two primary reflective mirrors 11a and 11b whose respective cross sections are appropriate curves that are not parabolas (e.g., one is a circular arc). In this case, the primary reflected light rays 15a are not focused at the focal line; however, if the primary reflected rays 15a are reflected with an appropriate curvature being selected for the cross-sectional shape of the other primary reflective mirror 11b, then the primary reflected light rays 15b from the primary reflective mirror 11b will be focused at the focal line. In other words, even if parabolic cylinder mirrors are not used, a function equivalent to that of parabolic cylinder mirrors can be realized. Furthermore, for example, in a case where the primary reflective mirror 11a is formed as a parabolic cylinder mirror, an elliptic cylinder mirror is used for the primary reflective mirror 11b. Then, by combining these mirrors with the secondary reflective mirror 12, it is possible to focus the secondary reflected light rays 16 at the focal point 13.

Next, an embodiment of the concrete construction used to form the abovementioned focal-line type parabolic cylindrical reflective mirrors used in the present invention into a mirror body will be described with reference to FIGS. 6 through 11.

Under a microgravity condition such as that encountered in space, mirrors can be made self-standing while maintaining a high degree of precision, even if the mirrors themselves are made extremely thin, by supporting only the two end parts of the mirrors by means of supporting members that are manufactured with a high degree of precision. This is effective in reducing the weight of the mirrors. FIG. 6 shows an example of this; here, a construction is used in which only the two ends of a mirror plate 1 are supported by curved supporting members 2 which are finished into a parabolic form with a high degree of precision. In this case, if precision is sacrificed to some extent, a further reduction in weight can be achieved by reducing the high-precision curved supporting members 2 to a supporting member 2 in a single location.

Meanwhile, a complete loss of function due to collision with space debris can be avoided by installing high-precision curved supporting members in parts other than the two ends as well, or by installing structural members that connect these supporting members. Furthermore, if these structural members are devised so that they also act as mirror supporting members, the precision of the mirrors can be increased even further.

Figure 7:
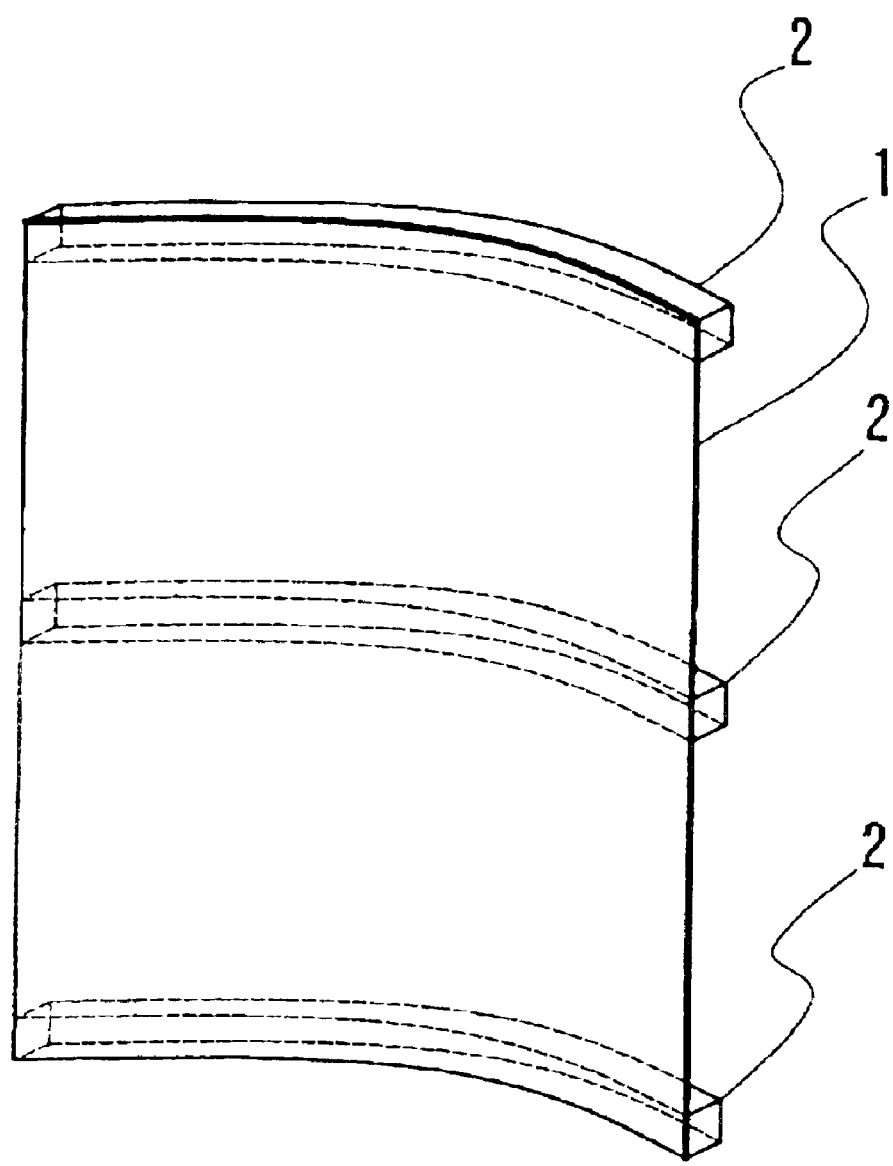
FIG. 7 is a perspective view which shows an embodiment in which the reflective mirrors in FIGS. 1 through 4 are constructed from thin-plate-form mirrors in which one other place is supported by a curved supporting member in addition to the two ends.
Figure 8:
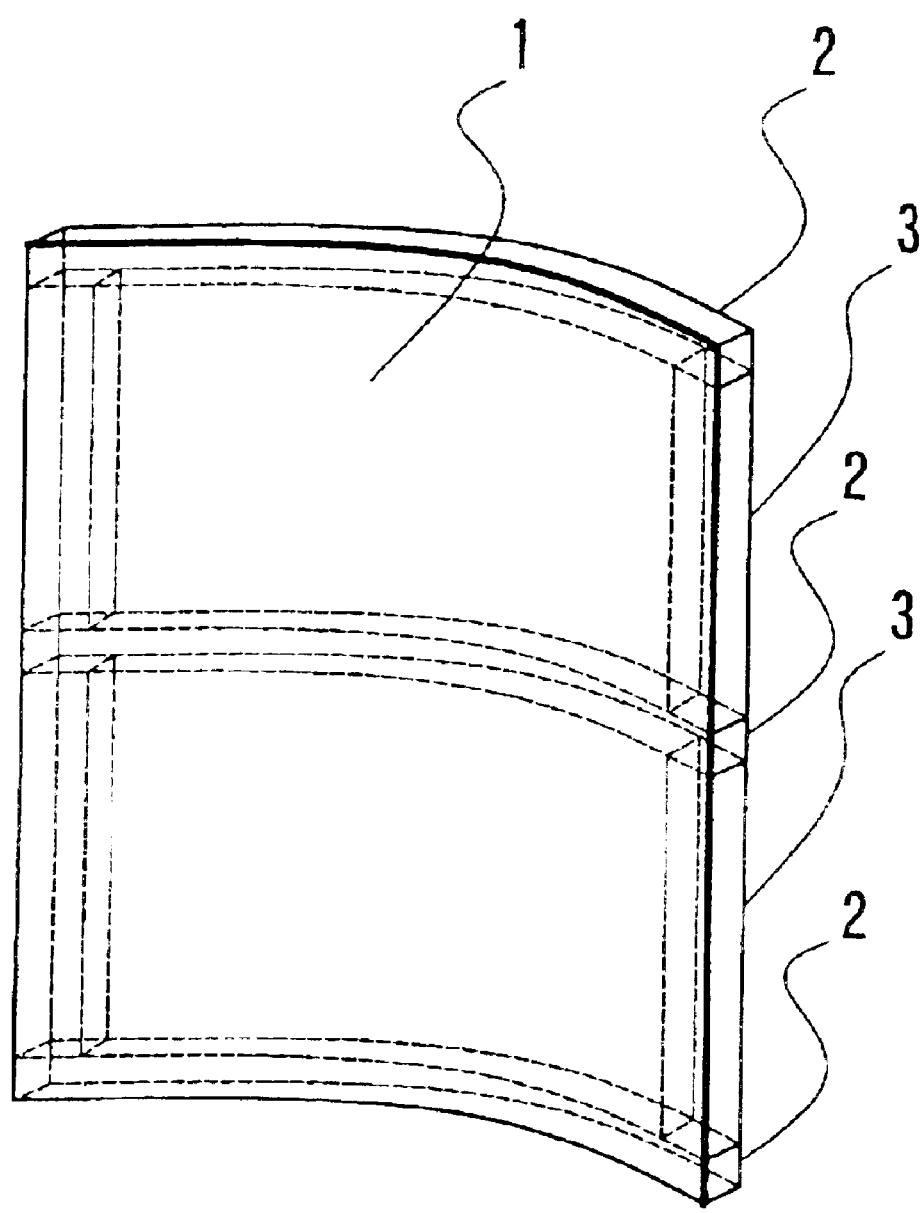
FIG. 8 is a perspective view which shows an embodiment in which the reflective mirrors in FIGS. 1 through 4 are constructed form thin-plate-form mirrors in which one other place is supported by a curved supporting member in addition to the two ends, and in which the curved supporting members are further connected by structural members.

In the embodiment shown in FIG. 7, the mirror body is constructed so that both ends of the mirror plate 1 are supported as in FIG. 6, and so that the mirror plate 1 is supported in an addition location (the central portion of the mirror plate 1 in the case shown in the figure) by the curved supporting member 2 finished to a high degree of precision. Furthermore, in the embodiment shown in FIG. 8, the mirror body is constructed so that both ends of the mirror plate 1 and an additional location are supported by the curved supporting members 2 finished to a high degree of precision as in FIG. 7, and so that the positional relationship of the curved supporting members 2 is fixed by structural members 3.

Figure 9:
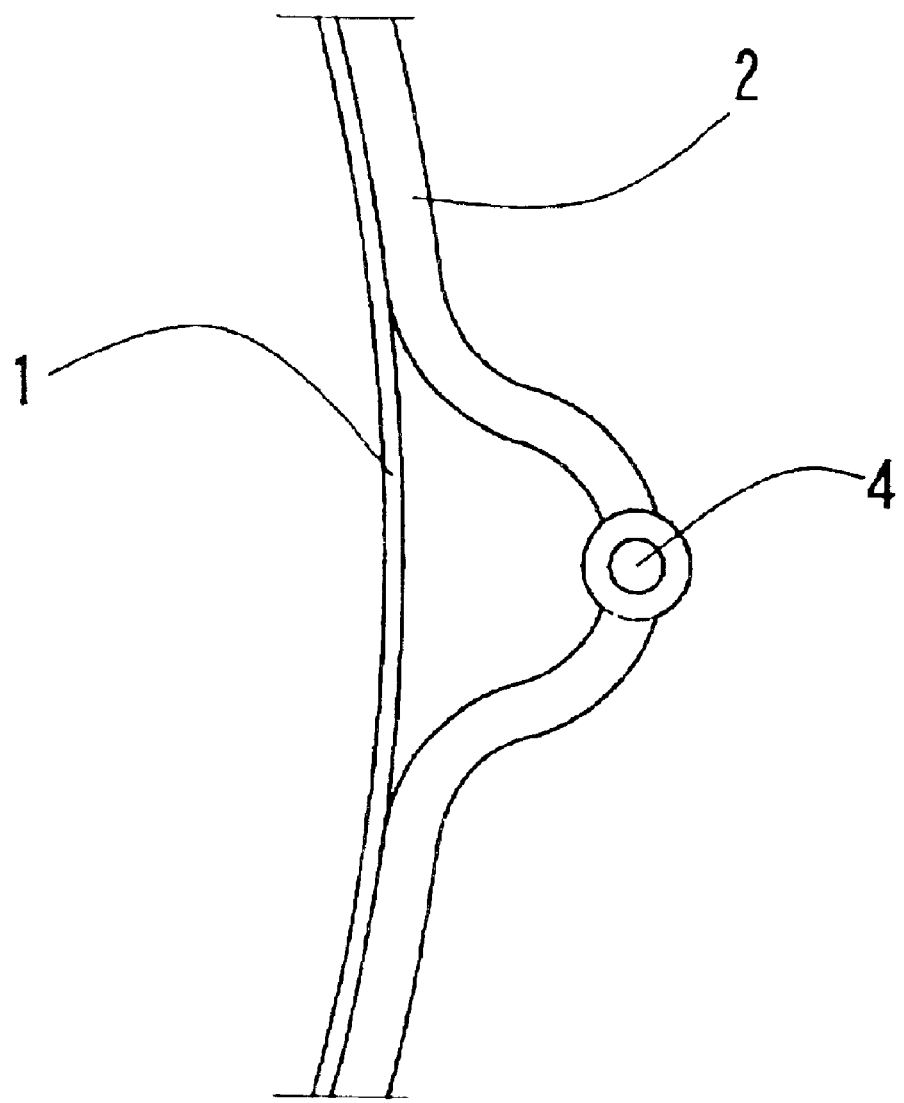
FIG. 9 is a cross-sectional view showing the construction of the essential parts of the curved supporting members in FIGS. 6 through 8, which are split and joined by hinges.

Furthermore, since the cross sections of the focal-line type parabolic cylindrical reflective mirrors of the present invention are linear with respect to a certain direction, hinges can be installed in the supporting members along these straight lines, and the mirrors can be folded up by means of these hinges, which is advantageous when these mirrors are loaded inside the fairing of a rocket. FIG. 9 shows an example of this; here, the curved supporting member 2 that supports the mirror plate 1 is split into parts, and these parts are connected by means of a hinge 4 to form a mirror body.

In the embodiments illustrated in FIGS. 6 through 9 above, the mirrors were supported by curved supporting members finished into a parabolic shape with a high degree of precision in order to obtain a specified mirror cross-sectional shape; however, if both ends of each mirror are supported linearly, and the positions and angles of these two ends are selected so that the cross-sectional shape of the mirror is formed into a shape that is close to that of a parabolic curve, the necessary mirror can be obtained without using high-precision curved supporting members, so that manufacture is facilitated.

Figure 10:
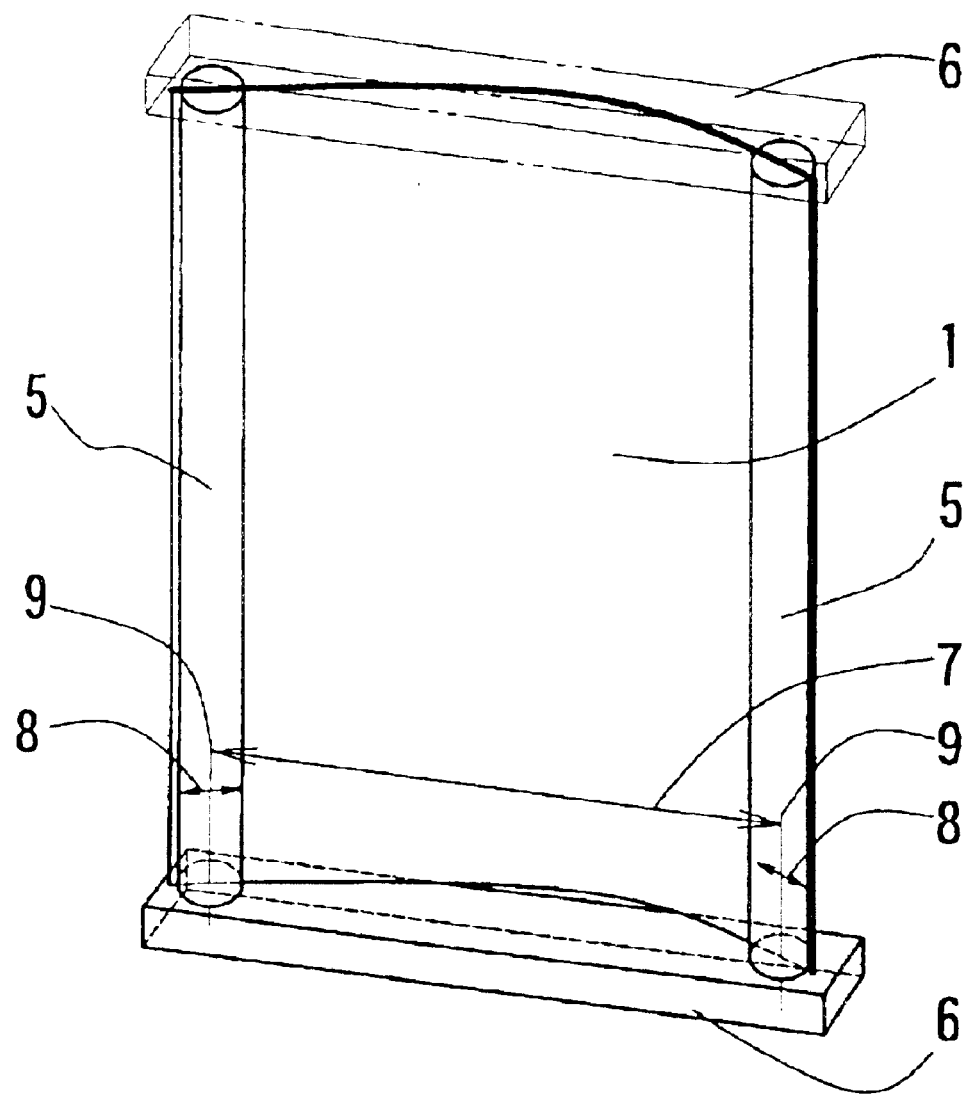
FIG. 10 is a perspective view which shows an embodiment in which the reflective mirrors in FIGS. 1 through 4 are constructed from thin-plate-form mirrors in which both ends of the mirror are supported by linear supporting members.

FIG. 10 shows an example of this; here, the mirror body is constructed so that both ends of the mirror plate 1 are supported by two linear supporting members 5, and these two supporting members 5 are connected by structural members 6. When the supporting members 5 are attached to the structural members 6, the spacing 7 between the two supporting members 5, the positions of the supporting members 5 with respect to the direction 8 that is parallel to the mirror, and the angle of rotation of the supporting members 5 about the axis of rotation 9, are adjusted so that the cross-sectional shape of the mirror plate 1 is close to a parabola.

In this case, if the width of the mirror is made non-uniform, the area where the width is narrow will undergo a great deformation, and the area where the width is wide will undergo little deformation, when a bending force is applied from both ends. Accordingly, by selecting this width in an appropriate manner, it is easily possible to cause the cross-section shape of the mirror to approach the shape of a parabolic curve.

Figure 11:
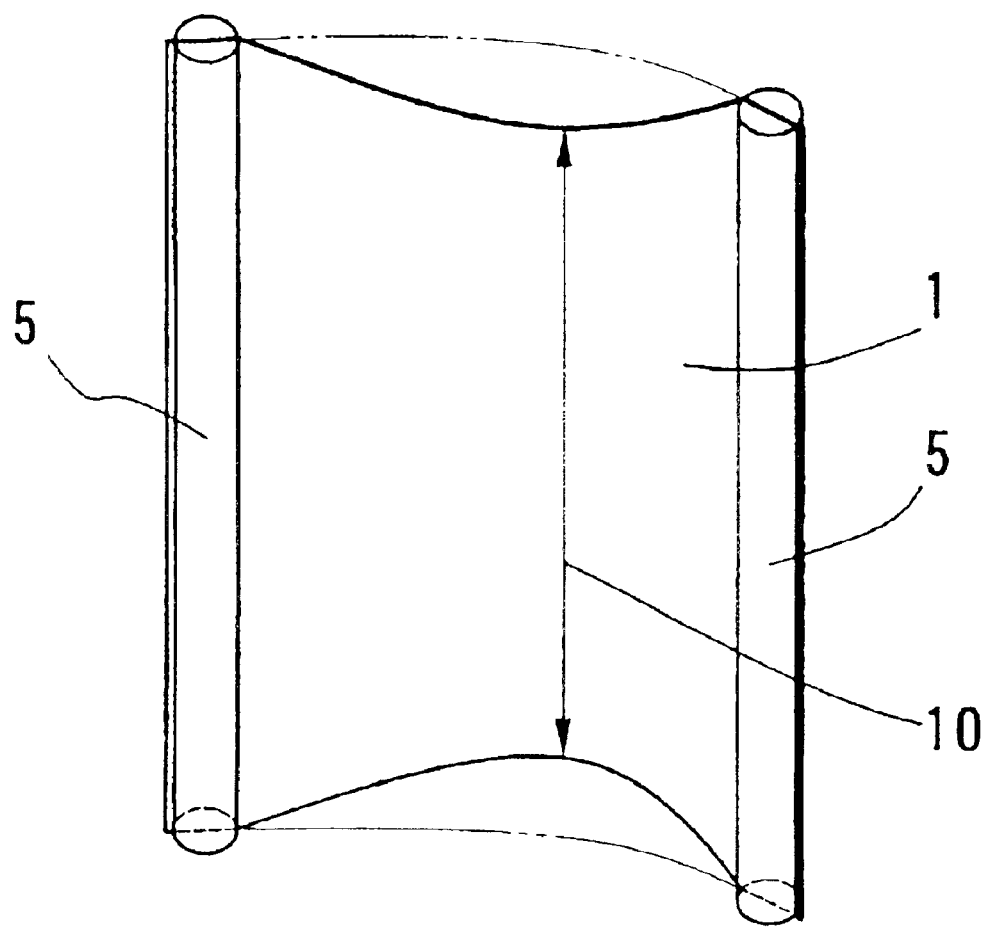
FIG. 11 is a perspective view which shows an embodiment in which the reflective mirrors in FIGS. 1 through 4 are constructed from thin-plate-form mirrors that have a non-uniform width, in which both ends of the mirror are supported by linear supporting members.

FIG. 11 shows an example of this; here, the mirror body is constructed so that both ends of the mirror plate 1 are supported by the two linear supporting members 5. The width of the mirror plate 1 is non-uniform, and narrows in one location as indicated by 10; accordingly, when a bending stress is applied by means of the two linear supporting members 5, the cross-sectional shape can be varied to form a parabola. In this case, a drop in precision caused by deformation or the like of the mirror due to changes in the ambient temperature or the like can also be prevented by using a driving device to control the positions and angles of both ends.

In the embodiments shown in FIGS. 6 through 11 above, the mirror plate 1 had a shape that was symmetrical in both the left-right and vertical directions. However, the present invention is not limited to such a shape; the mirror plate may also have a shape that is asymmetrical in both the left-right and vertical directions. Furthermore, in the embodiments shown in FIGS. 7 and 8, the curved supporting members 2 were installed only at both ends of the mirror plate 1 and in one location in the central portion of the mirror plate 1; however, neither the locations of installation nor the number of supporting members used are limited to this. Furthermore, in the embodiment shown in FIG. 7, the structural members 3 were installed in only two locations at both ends of the mirror plate 1; however, neither the locations nor the number of structural members are limited to this. Moreover, the attachment angles of the curved supporting members 2 and structural members 3 were set as right angles; however, these angles are not limited to right angles. Furthermore, the structural members 3 can also be utilized as supporting members that increase the precision of the mirror body 1.

Furthermore, in regard to the attachment of the two supporting members 5 and structural members 6 in the embodiment shown in FIG. 10, it would also be possible to use a structure in which the positions of the supporting members 5 with respect to the direction 8 parallel to the mirror and the angles of rotation of the supporting members 5 about the axis of rotation 9 are varies by means of a driving device (not shown in the figures) instead of being fixed. Moreover, in the embodiments shown in FIGS. 6 through 9, these curved supporting members were installed on the back side of the mirror; however, it would of course also be possible to install these supporting members on the front side of the mirror.

Cases in which the electromagnetic wave focusing device of the present invention was utilized as a sunlight focusing device were described above; however, the electromagnetic wave focusing device of the present invention can also be utilized as a transmitting and receiving device of electromagnetic waves used in communications which like sunlight are electromagnetic waves. In such a case, incident plane waves can be focused at one point by installing a radiator in an appropriate orientation in the position of the focal point 13 in the embodiments shown in FIGS. 1 through 5, and this can be used as an antenna with high directionality to receive electromagnetic waves with a high degree of focusing.

In the electromagnetic wave focusing device of the present invention, focal-line type parabolic cylindrical reflective mirrors which are not rotationally symmetrical, but which have a parabolic cross-sectional shape in an arbitrary cross section perpendicular to a certain direction, and which are easy to manufacture, can be used as mirror bodies, and reflective mirrors can be constructed from mirror films and frame assemblies having a specified shape, so that the electromagnetic wave focusing device can be made extremely thin and light-weight. Furthermore, since the device can be folded up without any great loss or precision or large increase in mass, the device can be loaded in a small space. Accordingly, when the electromagnetic wave focusing device of the present invention is used as a sunlight focusing device, the mirror bodies themselves can be folded up into a compact shape and loaded in the small space of a rocket or the like. Thus, the device can be transported into space, and a sunlight focusing device which has a high focusing performance can be reproduced on-site with a high degree of precision.

What is claimed is:

1. An electromagnetic wave focusing device comprising:

a mirror group consisting of a focal-line type primary reflective mirror and secondary reflective mirror each having a unique parabolic cross-sectional shape in a cross section perpendicular to some direction, wherein incident plane waves are primarily reflected by said primary reflective mirror and secondarily reflected by said secondary reflective mirror, so that these plane waves are focused at one point, wherein the mirrors in said mirror group are constructed from mirror bodies consisting of thin sheet materials or film materials, and are formed with self-standing structure in which one or both end parts of each of said mirror bodies are supported by supporting members that have a parabolic supporting shape or curved supporting shape that imparts a focusing function equivalent to that of a parabola as a result of being combined with the function of other mirrors, and wherein said supporting members are divided via hinges, so that the mirror bodies have foldable structure.

2. An electromagnetic wave focusing device comprising:

a mirror group consisting of a focal-line type primary reflective mirror and secondary reflective mirror each having a unique parabolic cross-sectional shape in a cross section perpendicular to some direction, wherein incident plane waves are primarily reflected by said primary reflective mirror and secondarily reflected by said secondary reflective mirror, so that these plane waves are focused at one point, wherein the mirrors in said mirror group are constructed from mirror bodies consisting of thin sheet materials or film materials, both end parts of said mirror bodies are supported by linear supporting members, and the cross-sectional shapes of the mirror bodies are caused to approximate the shape of a parabola, or to a curve which has a focusing function equivalent to this parabola as a result of being combined with other mirrors, by moving or rotating said linear supporting members, and wherein the widths of said mirror bodies are parallel to said linear supporting members, and said widths are made non-uniform, so that the cross-sectional shapes of said mirror bodies are caused to approach the shape of a parabola or a curve which has a comparable focusing function as a result of being combined with other mirrors, when a bending force is applied to said mirror bodies from both ends via the linear supporting members that support both ends of said mirror bodies.

3. An electromagnetic wave focusing device comprising:
a mirror group consisting of a focal-line type primary reflective mirror and secondary reflective mirror each having a unique parabolic cross-sectional shape in a cross section perpendicular to some direction,
wherein incident plane waves are primarily reflected by said primary reflective mirror and secondarily reflected by said secondary reflective mirror, so that these plane waves are focused at one point,
wherein the mirrors in said mirror group are constructed from mirror bodies consisting of thin sheet materials or film materials, both end parts of said mirror bodies are supported by linear supporting members, and the cross-sectional shapes of the mirror bodies are caused to approximate the shape of a parabola, or to a curve which has a focusing function equivalent to this parabola as a result of being combined with other mirrors, by moving or rotating said linear supporting members,
wherein said primary reflective mirror is an asymmetrical parabolic cylinder mirror whose cross-sectional shape consists of an asymmetrical parabola which is such that the portion of said primary reflective mirror that is in the shadow of said secondary reflective mirror is reduced or eliminated, and
wherein the widths of said mirror bodies are parallel to said linear supporting members, and said widths are made non-uniform, so that the cross-sectional shapes of said mirror bodies are caused to approach the shape of a parabola or a curve which has a comparable focusing function as a result of being combined with other mirrors, when a bending force is applied to said mirror bodies from both ends via the linear supporting members that support both ends of said mirror bodies.

4. An electromagnetic wave focusing device comprising:
a mirror group consisting of a focal-line type primary reflective mirror and secondary reflective mirror each having a unique parabolic cross-sectional shape in a cross section perpendicular to some direction,
wherein incident plane waves are primarily reflected by said primary reflective mirror and secondarily reflected by said secondary reflective mirror, so that these plane waves are focused at one point,
wherein the mirrors in said mirror group are constructed from mirror bodies consisting of thin sheet materials or film materials, both end parts of said mirror bodies are supported by linear supporting members, and the cross-sectional shapes of the mirror bodies are caused to approximate the shape of a parabola, or to a curve which has a focusing function equivalent to this parabola as a result of being combined with other mirrors, by moving or rotating said linear supporting members,
wherein said primary reflective mirror is an inclined parabolic cylinder mirror which is disposed at an inclination to the incident waves so that the portion of said primary reflective mirror that is in the shadow of said secondary reflective mirror is reduced or eliminated, and
wherein the widths of said mirror bodies are parallel to said linear supporting members, and said widths are made non-uniform, so that the cross-sectional shapes of said mirror bodies are caused to approach the shape of a parabola or a curve which has a comparable focusing function as a result of being combined with other mirrors, when a bending force is applied to said mirror bodies from both ends via the linear supporting members that support both ends of said mirror bodies.

5. An electromagnetic wave focusing device comprising:
a mirror group consisting of a focal-line type primary reflective mirror and secondary reflective mirror each having a unique parabolic cross-sectional shape in a cross section perpendicular to some direction,
wherein incident plane waves are primarily reflected by said primary reflective mirror and secondarily reflected by said secondary reflective mirror, so that these plane waves are focused at one point,
wherein said primary reflective mirror is an asymmetrical parabolic cylinder mirror whose cross-sectional shape consists of an asymmetrical parabola which is such that the portion of said primary reflective mirror that is in the shadow of said secondary reflective mirror is reduced or eliminated,
wherein the mirrors in said mirror group are constructed from mirror bodies consisting of thin sheet materials or film materials, and are formed with self-standing structure in which one or both end parts of each of said mirror bodies are supported by supporting members that have a parabolic supporting shape or curved supporting shape that imparts a focusing function equivalent to that of a parabola as a result of being combined with the function of other mirrors, and wherein said supporting members are divided via hinges, so that the mirror bodies have foldable structure.

6. An electromagnetic wave focusing device comprising:
a mirror group consisting of a focal-line type primary reflective mirror and secondary reflective mirror each having a unique parabolic cross-sectional shape in a cross section perpendicular to some direction,
wherein incident plane waves are primarily reflected by said primary reflective mirror and secondarily reflected by said secondary reflective mirror, so that these plane waves are focused at one point,
wherein said primary reflective mirror is an inclined parabolic cylinder mirror which is disposed at an inclination to the incident waves so that the portion of said primary reflective mirror that is in the shadow of said secondary reflective mirror is reduced or eliminated,
wherein the mirrors in said mirror group are constructed from mirror bodies consisting of thin sheet materials or film materials, and are formed with self-standing structure in which one or both end parts of each of said mirror bodies are supported by supporting members that have a parabolic supporting shape or curved supporting shape that imparts a focusing function equivalent to that of a parabola as a result of being combined with the function of other mirrors, and wherein said supporting members are divided via hinges, so that the mirror bodies have foldable structure.

* * * * *